Figure 1:
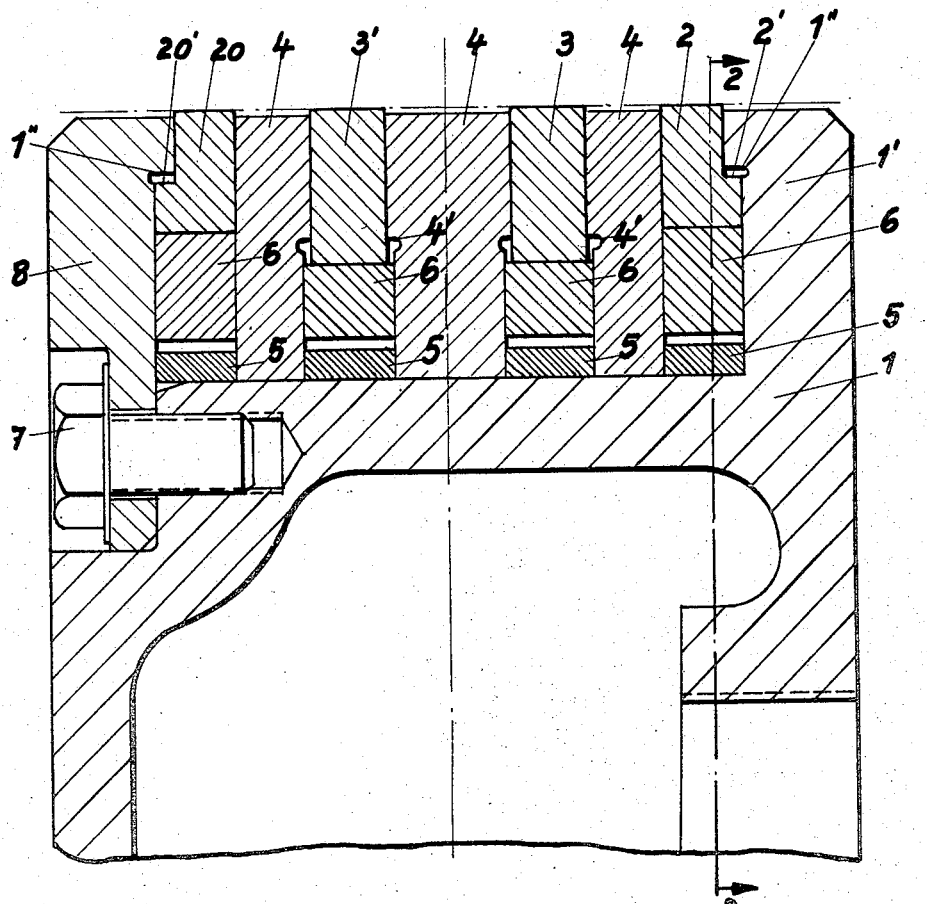

Nov. 18, 1958  A. FRENTZEN  2,860,935
PISTON ARRANGEMENT

Filed April 18, 1955  2 Sheets-Sheet 1

Inventor:
Alfred Frentzen
By:
Michael S. Striker
agt.

United States Patent Office 2,860,935
Patented Nov. 18, 1958

2,860,935

PISTON ARRANGEMENT

Alfred Frentzen, Dahlbruch, Westphalia, Germany, assignor to Firma Siemag, Siegener Maschinenbau G. m. b. H., Dahlbruch, Westphalia, Germany Application April 18, 1955, Serial No. 502,095

Claims priority, application Germany April 17, 1954

7 Claims. (Cl. 309—29)

The present invention relates to a new and improved piston arrangement. More particularly the present invention relates to a new and improved piston arrangement having a plurality of piston rings.

Piston ring arrangements as used in internal combustion engines and other types of machinery sometimes include a plurality of piston rings. Each of the piston rings may have different functions. For example, some of the piston rings may be used as guiding rings for properly centering the piston within the cylinder as the piston reciprocates therein. Other piston rings are used as sealing rings to prevent the lubricating oil and the combustion gases from leaking past the piston head.

Some improved pistons include slotted piston rings which have overlapping end portions. These rings are sometimes pretensioned so that they bear against the inside of the cylinder wall with a predetermined force. Therefore as the rings wear they are still biased against the cylinder wall by the action of the initial stresses set up in the pretensioned ring. Other arrangements are known wherein separate biasing means are used to urge the slotted piston rings against the cylinder wall.

These conventional arrangements have many disadvantages since it is possible for the pretensioned piston ring to become twisted between the piston and the cylinder wall after a portion of the ring has been worn away. Similarly a piston ring that is urged against the cylinder wall by separate biasing means can easily be broken or become twisted after certain amount of wearing away of the piston ring.

It is clear that if the piston ring breaks or is twisted between the piston and the cylinder wall the cylinder wall is scored and the cylinder block can easily be ruined.

On the other hand the present invention permits the piston rings to be urged against the cylinder wall to provide highly efficient operation of the internal combustion engine and also includes stop means for preventing the rings from being urged against a cylinder wall after they have been worn away a predetermined amount.

Accordingly it is an object of the present invention to provide a new and improved piston arrangement.

Another object of the present invention is to provide a new and improved piston arrangement having a plurality of piston rings.

A further object of the present invention is to provide a new and improved piston arrangement wherein the piston rings are urged against the cylinder walls.

Still another object of the present invention is to provide a piston arrangement having a plurality of guiding and sealing rings wherein each of the rings are urged against the cylinder wall by different amounts of force.

Yet another object of the present invention is to provide a new and improved piston arrangement having a plurality of piston rings wherein the piston rings are no longer urged against the cylinder wall after they have been worn away by a predetermined amount.

With the above objects in view the present invention mainly consists of a piston arrangement including a substantially cylindrical main body portion having in its peripheral surface at least one piston ring groove, at least one annular outwardly biased piston ring means located in the piston ring groove and having an outer diameter larger than the outer diameter of the main body means, and stop means mounted between the main body means and the piston ring means for limiting the outward movement of the outwardly biased piston ring.

Figure 2:
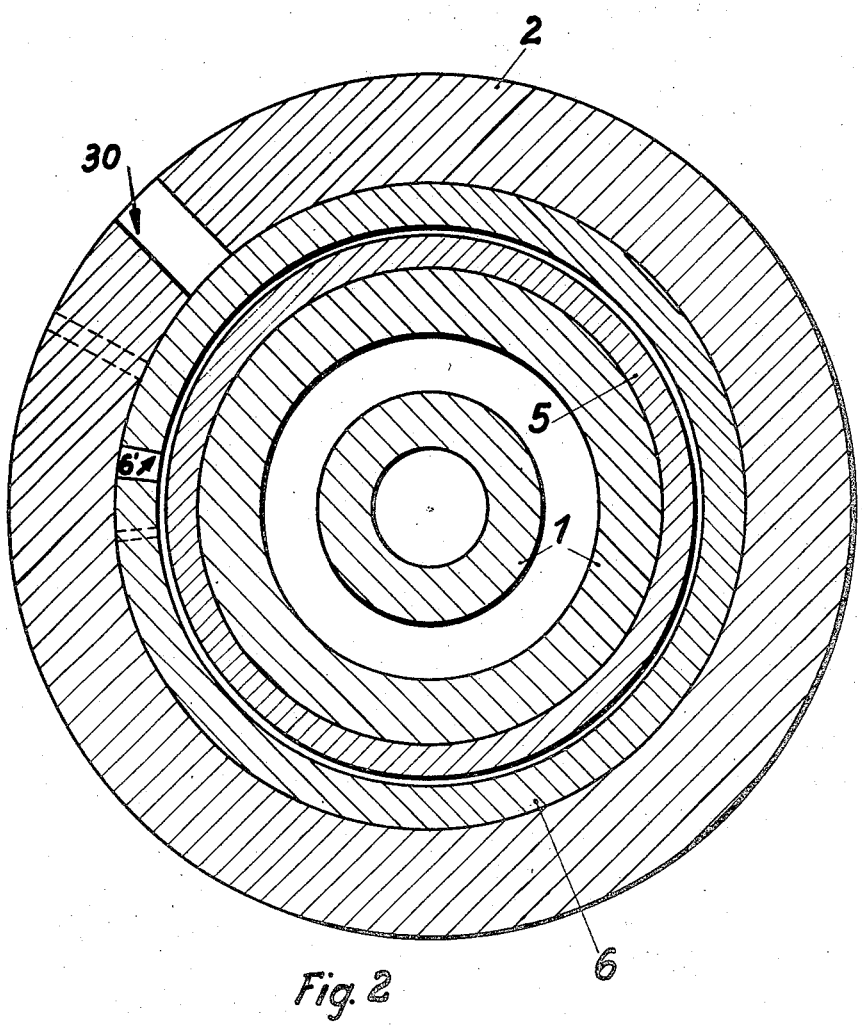

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a transverse sectional view of a portion of a piston constructed in accordance with the principles of the present invention; and Fig. 2 is a sectional view of Fig. 1 taken on the line 2—2 of Fig. 1.

Referring to the figures it is seen that the piston includes a substantially cylindrical main body portion 1 having an annular flange portion 1' at one end thereof. The flange 1' has a shoulder portion 1'' at one side thereof. Next to one face of the flange 1' is an annular piston ring 2 having a shoulder portion 2' facing the shoulder 1'' and capable of cooperating therewith. The piston ring 2 may be a guiding ring for the purpose of centering the main body portion of the piston within the unillustrated cylinder wall. In Fig. 2, the slotted portion 30 of the piston ring is clearly indicated. Spaced from the piston ring 2 are three additional piston rings 3, 3' and 20, respectively. These piston rings may also be annular rings and may be any combination of sealing or centering rings. The rings are maintained in spaced relationship by annular spacers 4 and 5. The spaces 5 maintain the distances between the spacers 4 to be slightly larger than the thickness of the respective piston rings so that the piston rings can be outwardly urged away from the axis of the main body of the piston. It can be seen that each of the spacers 4 has at least one shoulder 4'.

Mounted between each of the annular piston rings and the annular spacers 5 are respective annular biasing members 6 which urge the respective piston rings away from the main axis of the cylindrical body of the piston. As seen in Fig. 2 the biasing members may also have a slotted portion 6'.

The entire assembly is maintained in fixed relationship by clamping member 8 which is held by a set screw 7. The clamp 8 also has a shoulder portion 1''.

It can be seen that the piston rings 2 and 20 have shoulder portions 2' and 20' respectively facing and cooperating with shoulder portions 1'' in the flange 1' and in the clamp 8 respectively. It can also be seen that the biasing members 6 contacting the piston rings 3 and 3' are slightly thicker than their respective piston rings.

In operation the piston is easily assembled by merely sliding on the various annular rings, biasing members and spacers over the main body portion 1 of the piston. The clamp 8 is then affixed and the assembly is tightened by means of the screw 7. Because of the pretensioning of the biasing members 6, these members bear against their respective piston rings and urge the rings outwardly, away from the axis of the piston. When the piston is inserted in the cylinder of the engine, the biasing members 6 automatically adjusting the positioning of the piston rings against the cylinder walls.

When the piston rings wear away, the biasing members 6 continue to urge these rings against the cylinder wall so that the rings can efficiently perform their sealing and guiding functions. However, after the piston rings 2 and 20 have been worn away by a predetermined amount, it can be seen that their respective shoulders 2' and 20' will bear up against the respective shoulders 1". This will effectively prevent the biasing members 6 from urging the piston ring against the cylinder wall and will result in a slight gap between the piston ring and the cylinder wall.

Similarly, after the piston rings 3 and 3' have been worn away by a predetermined amount, the wider biasing members 6 will bear up against their respective shoulders 4' and be effectively prevented from urging their respective rings 3 and 3' against the cylinder wall.

Therefore, as the machines continue to operate after the biasing means have contacted the shoulder stop means, the power output and the efficiency of the machine will decrease to give warning to the operator of the machine that new piston rings are required. It is apparent that such advantageous construction of the piston prevents any scoring of the cylinder walls or other injury to the interior of the engine.

It should be clear that the force applied by the biasing member 6 against their respective piston rings need not be the same for the different types of piston rings. For example, as seen in Fig. 1, the slotted biasing members 6 for the outer piston rings 2 and 20 are substantially wider than the intermediate biasing members 6. The piston rings 2 and 20 are therefore urged outwardly by an amount greater than the piston rings 3 and 3'. Also, as can be seen in the drawing, a greater amount of erosion of some of the piston rings may be permitted than for others. For example, the distance between the thicker biasing members 6 used with the rings 3 and 3' and their respective shoulder portions 4' is larger than the distance between the shoulder portions 2' and 20 and their respective stop means 1". Therefore, more of the piston rings 3 and 3' can be worn away than piston rings 2 and 20 before the stop means become effective.

It should also be clear that separate biasing members 6 are not necessary if the piston rings themselves are initially pretensioned so as to be urged against the cylinder walls by their own inner stresses. In such an arrangement, of course, the piston rings would contain shoulder portions which would cooperate with respective stop means.

It will be understood that each of the elements described above, or two or more together, may also find a useful application in other types of piston arrangement differing from the types described above.

While the invention has been illustrated and described as embodied in a piston arrangement having a plurality of piston rings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a piston arrangement, in combination, a substantially cylindrical main body means having in its peripheral surface a plurality of piston ring grooves; at least one annularly outwardly biased guiding piston ring located in one of said piston ring grooves and having an outer diameter larger than the outer diameter of said main body means; at least one outwardly biased sealing piston ring located in another of said piston ring grooves and having an outer diameter larger than the outer diameter of said main body means; and a plurality of stop means each associated with one of said piston rings for limiting the outward movement thereof, the stop means limiting the outward movement of said sealing piston ring permitting farther outward movement of said ring than the stop means limiting the outward movement of said guiding piston ring.

2. In a piston arrangement, in combination, a substantially cylindrical main body means having in its peripheral surface a plurality of piston ring grooves; at least one annular guiding piston ring located in one of said piston ring grooves and having an outer diameter larger than the outer diameter of said main body means; at least one sealing piston ring located in another of said piston ring grooves and having an outer diameter larger than the outer diameter of said main body means; a plurality of biasing means, each of said biasing means respectively outwardly urging one of said piston ring means; and a plurality of stop means each associated with one of said piston rings for limiting the outward movement thereof, the stop means limiting the outward movement of said sealing piston ring permitting farther outward movement of said ring than the stop means limiting the outward movement of said guiding piston ring.

3. In a piston arrangement, in combination, a substantially cylindrical main body means having an annular flange at one end thereof; clamping means removably mounted at the other end of said main body means; at least one annular outwardly biased guiding piston ring mounted on said main body means between said annular flange and said clamping means and having an outer diameter larger than the outer diameter of said main body means; at least one annular outwardly biased sealing piston ring mounted on said main body means between said guiding piston ring means and said clamping means and spaced therefrom, said sealing piston ring having an outer diameter larger than the outer diameter of said main body means, said guiding piston ring being outwardly biased by a force greater than said sealing piston ring; spacing means for maintaining said flange, said piston rings and said clamping means each associated with one of said piston rings in spaced relationship; and a plurality of stop means for limiting the outward movement thereof, the stop means limiting the outward movement of said sealing piston ring permitting farther outward movement of said ring than the stop means limiting the outward movement of said guiding piston ring.

4. In a piston arrangement, in combination, a substantially cylindrical main body means having an annular flange at one end thereof; clamping means removably mounted at the other end of said main body means; at least one annular outwardly biased guiding piston ring mounted on said main body means between said annular flange and said clamping means and having an outer diameter larger than the outer diameter of said main body means; at least one annular outwardly biased sealing piston ring mounted on said main body means between said guiding piston ring means and said clamping means and spaced therefrom, said sealing piston ring means having an outer diameter larger than the outer diameter of said main body means, said guiding piston ring being outwardly biased by a force greater than said sealing piston ring; spacing means for maintaining said flange, said piston rings and said clamping means in spaced relationship; and a plurality of stop means, at least one of said stop means being mounted respectively between said annular flange of said main body means and one of said piston ring means, at least another of said stop means being mounted respectively between said clamping means and another of said piston ring means, each of said stop means limiting the outward movement of its respective outwardly biased piston ring, the stop means limiting the outward movement of said sealing piston ring permitting farther outward movement of said ring than the stop means limiting the outward movement of said guiding piston ring.

5. In a piston arrangement, in combination, a substantially cylindrical main body means having in its peripheral surface a plurality of piston ring grooves; at least one slotted annular guiding piston ring located in one of said piston ring grooves and having an outer diameter larger than the outer diameter of said main body means; at least one slotted sealing piston ring located in another of said piston ring grooves and having an outer diameter larger than the outer diameter of said main body means; a plurality of biasing means, each of said biasing means respectively outwardly urging one of said piston rings; and a plurality of stop means each associated with one of said piston rings, for limiting the associated with one of said piston rings for limiting the outward movement of said sealing piston ring permitting farther outward movement of said ring than the stop means limiting the outward movement of said guiding piston ring.

6. In a piston arrangement, in combination, a substantially cylindrical main body means having an annular flange at one end thereof; clamping means removably mounted at the other end of said main body means; at least one annular outwardly biased guiding piston ring mounted on said main body means between said annular flange and said clamping means and having an outer diameter larger than the outer diameter of said main body means; at least one annular outwardly biased sealing piston ring mounted on said main body means between said guiding piston ring and said clamping means and spaced therefrom, said sealing piston ring having an outer diameter larger than the outer diameter of said main body means, said guiding piston ring being outwardly biased by a force greater than said sealing piston ring; spacing means for maintaining said flange, said piston rings and said clamping means in spaced relationship; and a plurality of stop means, at least one of said stop means being mounted respectively between said spacing means and one of said piston ring means, at least another of said stop means being mounted respectively between said spacing means and another of said piston ring means, each of said stop means limiting the outward movement of its respective outwardly biased piston ring, the stop means limiting the outward movement of said sealing piston ring permitting farther outward movement of said ring than the stop means limiting the outward movement of said guiding piston ring.

7. In a piston arrangement, in combination, a substantially cylindrical main body means having an annular flange at one end thereof; clamping means removably mounted at the other end of said main body means; at least one annular guiding piston ring mounted on said main body means between said annular flange and said clamping means and having an outer diameter larger than the outer diameter of said main body means; at least one annular sealing piston ring mounted between said guiding piston ring and said clamping means and spaced from said guiding piston ring, said sealing piston ring having an outer diameter larger than the outer diameter of said main body means; spacing means for maintaining said piston rings in spaced relationship; a plurality of biasing means, each of said biasing means respectively outwardly urging one of said piston ring means; and a plurality of stop means for limiting the outward movement of said piston rings, the stop means for the guiding piston ring comprising a shoulder integral with the guiding piston ring and the stop means for the sealing piston ring comprising a shoulder formed on said spacing means and engaging the biasing means acting on said sealing ring, and the stop means for the sealing piston ring permitting farther outward movement of said ring than the stop means for said guiding piston ring.

References Cited in the file of this patent
UNITED STATES PATENTS

| | | |
|---|---|---|
| 2,076,302 | Muchnic | Apr. 6, 1937 |
| 2,295,521 | Payne et al. | Sept. 8, 1942 |
| 2,420,690 | Tatham | May 20, 1947 |
| 2,736,625 | Naab | Feb. 28, 1956 |